United States Patent
Huang et al.

(10) Patent No.: US 9,441,517 B2
(45) Date of Patent: Sep. 13, 2016

(54) DIESEL ENGINE EXHAUST TREATMENT SYSTEM

(75) Inventors: Yinyan Huang, Northville, MI (US); Ed Badillo, Flat Rock, MI (US); Christine Kay Lambert, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1251 days.

(21) Appl. No.: 12/874,639

(22) Filed: Sep. 2, 2010

(65) Prior Publication Data

US 2011/0138776 A1 Jun. 16, 2011

(51) Int. Cl.
| | |
|---|---|
| F01N 3/00 | (2006.01) |
| F01N 3/20 | (2006.01) |
| F01N 3/035 | (2006.01) |
| F01N 3/10 | (2006.01) |
| F01N 13/00 | (2010.01) |

(52) U.S. Cl.
CPC ............. *F01N 3/2066* (2013.01); *F01N 3/035* (2013.01); *F01N 3/103* (2013.01); *F01N 13/009* (2014.06); *F01N 13/0093* (2014.06); *F01N 13/0097* (2014.06); *F01N 2510/063* (2013.01); *F01N 2510/0682* (2013.01); *F01N 2610/02* (2013.01); *Y02T 10/24* (2013.01)

(58) Field of Classification Search
USPC .......... 60/274, 286, 295, 297, 301, 303, 311
See application file for complete search history.

(56) References Cited

U.S. PATENT DOCUMENTS

| | | |
|---|---|---|
| 5,069,697 A | 12/1991 | Hamaguchi et al. |
| 5,727,385 A | 3/1998 | Hepburn |
| 5,964,088 A | 10/1999 | Kinugasa et al. |
| 6,047,542 A | 4/2000 | Kinugasa et al. |
| 6,109,024 A | 8/2000 | Kinugasa et al. |
| 6,133,185 A | 10/2000 | Kinugasa et al. |
| 6,467,257 B1 | 10/2002 | Khair et al. |
| 6,641,785 B1 | 11/2003 | Neufert et al. |
| 6,677,264 B1 | 1/2004 | Klein et al. |

(Continued)

FOREIGN PATENT DOCUMENTS

| | | |
|---|---|---|
| WO | 2006045315 A1 | 5/2006 |
| WO | 2007141638 A2 | 12/2007 |
| WO | 2008070551 A2 | 6/2008 |

OTHER PUBLICATIONS

Tennison et al., "NOx Control Development With Urea SCR on a Diesel Passenger Car", SAE International, 2004 SAE World Congress, Detroit, Michigan, Mar. 8-11, 2004.

(Continued)

*Primary Examiner* — Thomas Denion
*Assistant Examiner* — Matthew T Largi
(74) *Attorney, Agent, or Firm* — Julia Voutyras; Alleman Hall McCoy Russell & Tuttle LLP

(57) ABSTRACT

A diesel engine exhaust treatment system is provided which includes a diesel oxidation catalyst and a diesel particulate filter, where a first SCR catalyst is positioned at the inlet of the diesel particulate filter, and a second SCR catalyst is coated on the filter. The first and second SCR catalysts each have a low loading, such that a lower backpressure is achieved over the use of a single SCR-coated diesel particulate filter at higher catalyst loadings. The exhaust treatment system also provides effective catalyst efficiency for removal of $NO_x$ and other gaseous emissions.

15 Claims, 4 Drawing Sheets

(56) References Cited

U.S. PATENT DOCUMENTS

| | | |
|---|---|---|
| 6,928,806 B2 * | 8/2005 | Tennison et al. ............... 60/286 |
| 6,964,157 B2 | 11/2005 | Adelman et al. |
| 7,062,904 B1 | 6/2006 | Hu et al. |
| 7,094,728 B2 | 8/2006 | Yan et al. |
| 7,097,817 B2 | 8/2006 | Brisley et al. |
| 7,117,667 B2 | 10/2006 | Mital et al. |
| 7,119,044 B2 | 10/2006 | Wei et al. |
| 7,150,145 B2 | 12/2006 | Patchett et al. |
| 7,178,331 B2 | 2/2007 | Blakeman et al. |
| 7,181,906 B2 | 2/2007 | Dalla Betta et al. |
| 7,188,469 B2 | 3/2007 | Bonadies et al. |
| 7,189,375 B2 | 3/2007 | Molinier et al. |
| 7,213,395 B2 | 5/2007 | Hu et al. |
| 7,225,613 B2 | 6/2007 | Hammerle et al. |
| 7,257,941 B1 | 8/2007 | Reuter |
| 7,264,785 B2 | 9/2007 | Blakeman et al. |
| 7,332,135 B2 | 2/2008 | Gandhi et al. |
| 7,371,353 B2 | 5/2008 | Robel et al. |
| 2004/0037554 A1 | 2/2004 | van Setten et al. |
| 2004/0076565 A1 | 4/2004 | Gandhi et al. |
| 2005/0031514 A1 | 2/2005 | Patchett et al. |
| 2005/0232830 A1 | 10/2005 | Bruck |
| 2006/0010859 A1 | 1/2006 | Yan et al. |
| 2006/0100098 A1 | 5/2006 | Ura et al. |
| 2006/0153761 A1 * | 7/2006 | Bandl-Konrad et al. .. 423/239.1 |
| 2006/0179825 A1 | 8/2006 | Hu et al. |
| 2006/0242947 A1 | 11/2006 | Kay et al. |
| 2006/0251548 A1 | 11/2006 | Willey et al. |
| 2006/0254258 A1 | 11/2006 | Blakeman et al. |
| 2007/0012032 A1 | 1/2007 | Hu |
| 2007/0056268 A1 | 3/2007 | McCarthy, Jr. |
| 2007/0079605 A1 | 4/2007 | Hu et al. |
| 2007/0128088 A1 | 6/2007 | Willey et al. |
| 2007/0144153 A1 | 6/2007 | Gandhi et al. |
| 2007/0144156 A1 | 6/2007 | Gandhi et al. |
| 2007/0157608 A1 | 7/2007 | Gandhi et al. |
| 2007/0196246 A1 | 8/2007 | Yano |
| 2007/0224093 A1 | 9/2007 | Miyairi et al. |
| 2007/0238605 A1 | 10/2007 | Strehlau et al. |
| 2007/0240402 A1 | 10/2007 | Andreasson et al. |
| 2007/0283681 A1 | 12/2007 | Makkee et al. |
| 2008/0006025 A1 | 1/2008 | McCarthy |
| 2008/0060348 A1 * | 3/2008 | Robel et al. ............... 60/295 |
| 2008/0127634 A1 | 6/2008 | Cho et al. |
| 2008/0141661 A1 * | 6/2008 | Voss et al. ............... 60/295 |
| 2008/0282670 A1 | 11/2008 | McCarthy, Jr. et al. |
| 2008/0292519 A1 | 11/2008 | Caudle et al. |
| 2008/0314031 A1 | 12/2008 | Shamis et al. |
| 2009/0288402 A1 * | 11/2009 | Voss et al. ............... 60/299 |

OTHER PUBLICATIONS

Orlando et al., "The reactions of NO2 and CH3CHO with Na—Y zeolite and the relevance to plasma-activated lean NOx catalysis", Science Direct, Catalysis Today 89 (2004) 151-157.

Thomas Screen, "Platinum Group Metal Perovskite Catalysts", Apr. 2007; Platinum Metals Review, vol. 51 Issue 2, pp. 87-92, UK.

Timothy V. Johnson, "Diesel Emission Control in Review", 2009; SAE Int. J. Fuels Lubr, vol. 2 Issue 1, pp. 1-12.

Mark Jagner, et al., "Detection, Origin, and Effect of Ultra-Low Platinum Contamination on Diesel-SCR Catalysts", Oct. 6, 2008; SAE International Virtual Conference Center, p. 1.

D. Fino, et al., "Diesel Particulate Abatement via Wall-Flow Traps Based on Perovskite Catalysts", Sep.-Oct. 2003; PubMed, U.S. National Library of Medicine, National Institutes of Health; p. 1.

Office Action pertaining to U.S. Appl. No. 12/200,100 dated Dec. 7, 2010.

Office Action pertaining to U.S. Appl. No. 12/425,986 dated May 14, 2010.

Office Action pertaining to U.S. Appl. No. 12/425,986 dated Oct. 26, 2010.

* cited by examiner

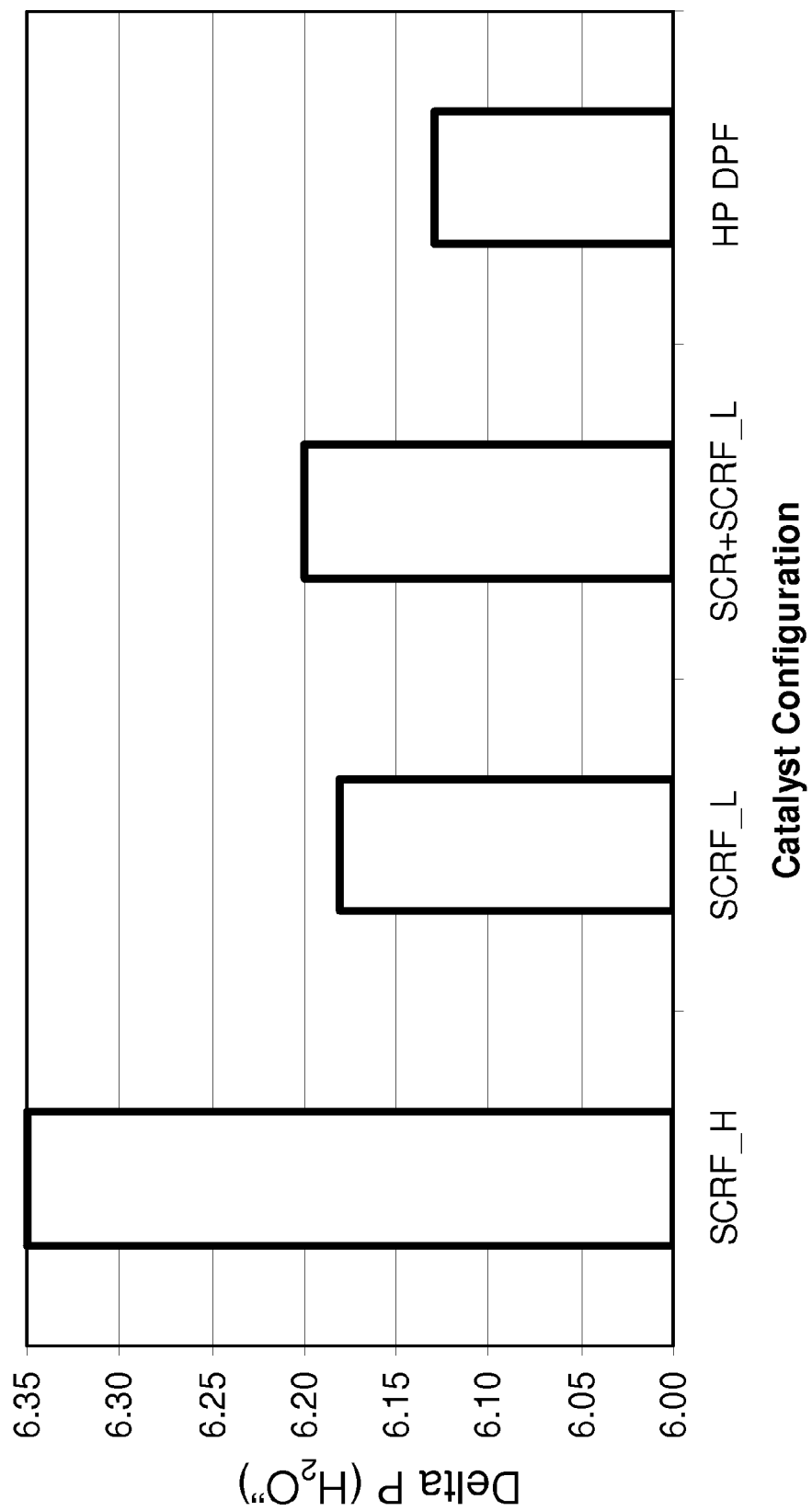

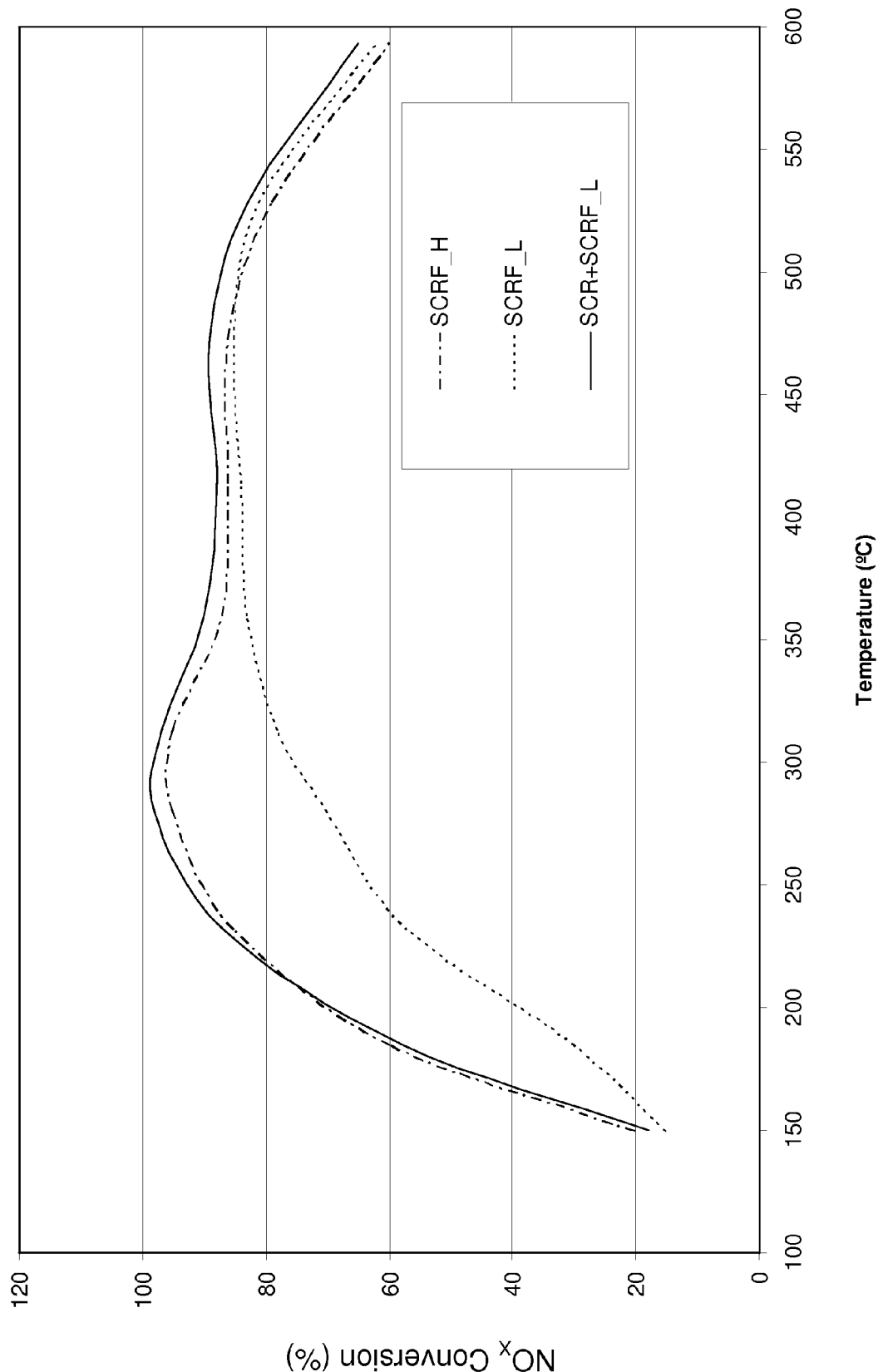
Figure 4 NO-SCR activities of various systems

DIESEL ENGINE EXHAUST TREATMENT SYSTEM

BACKGROUND OF THE INVENTION

Embodiments described herein relate to a diesel engine exhaust treatment system, and more particularly, to an exhaust treatment system which utilizes a selective reduction catalyst (SCR) in combination with an SCR-coated diesel particulate filter, where the system achieves reduced backpressure in comparison with a system which utilizes a single SCR-coated filter.

In recent years, environmental regulations in the United States and Europe restricting diesel particulate emissions have necessitated improvements in the removal of particulates from diesel engine emissions. Diesel engine exhaust contains gaseous emissions such as carbon monoxide (CO), unburned hydrocarbons (HC), and nitrogen oxides ($NO_x$), as well as particulate matter.

Diesel engine exhaust treatment systems are currently used to convert these exhaust components to environmentally acceptable compounds and to remove particulates. Such systems typically include the use of a diesel oxidation catalyst (DOC), a selective catalytic reduction catalyst (SCR), and/or a diesel particulate filter (DPF).

Diesel oxidation catalysts are placed in the exhaust gas stream of a diesel engine and typically contain platinum group metals (PGM), base metals, or a combination thereof. These catalysts promote the conversion of CO and HC emissions to carbon dioxide and water.

Selective catalytic reduction catalysts (SCR) are used to convert $NO_x$ to $N_2$ and typically comprise a base metal and utilize an ammonia reductant, typically in the form of aqueous urea, which is injected in the exhaust stream downstream from the diesel oxidation catalyst. After water vaporization and urea hydrolysis, the formed ammonia reacts with $NO_x$ in the exhaust gas stream on the SCR catalyst to form $N_2$.

A diesel particulate filter (DPF) collects soot or particulate matter from engine exhaust. As soot accumulates on the filter, an increase in pressure drop occurs across the DPF, which requires regeneration of the filter by combustion of the accumulated particulates at elevated temperatures. A precious metal catalyst is also typically coated on the DPF for the removal of CO, HO, and $NH_3$ slip.

A typical diesel engine exhaust treatment system for light and heavy duty applications includes a diesel oxidation catalyst (DOC), selective catalytic reduction catalyst (SCR), and diesel particulate filter (DPF) in the form of three separate units, each positioned downstream from the other in the exhaust stream. However, while such a system is efficient for meeting current emission regulations, it suffers from a number of drawbacks. For example, in some vehicle applications, the available space for packaging all of these components is limited. The use of three separate units results in a large system which produces a high exhaust counterpressure (backpressure) as the exhaust flows through each unit. In addition, the use of large sized diesel particulate filters including a precious metal catalyst coating makes the system expensive to produce due to the high cost of platinum group metals.

An alternative diesel exhaust treatment system is described in U.S. Patent Application 2005/0031514, which includes a diesel oxidation catalyst positioned upstream from a diesel particulate filter, where the filter includes a selective catalytic reduction catalyst coated thereon such that the diesel particulate filter performs two catalytic functions, i.e., removal of particulates from the exhaust stream and conversion of $NO_x$ to $N_2$. The system further includes a separate SCR catalyst or slip oxidation catalyst unit downstream from the filter. While such an integrated system has a smaller volume, it is known that the presence of a DPF generally results in an increase in backpressure in the exhaust system, which adversely affects catalyst performance and fuel economy. As a result, where the SCR is integrated with the DPF, a higher catalyst loading of up to 2 g/in.$^3$ is typically required in order to achieve high $NO_x$ removal efficiency and durability. However, such an increased catalyst loading results in an increase in backpressure and lower fuel efficiency.

Accordingly, there is still a need in the art for a diesel engine exhaust system which efficiently achieves conversion of components and removal of particulates in the exhaust gas in an efficient and cost-effective manner, which provides good fuel efficiency, and which reduces backpressure.

SUMMARY OF THE INVENTION

Embodiments of the invention meet those needs by providing a diesel engine exhaust treatment system which utilizes a first SCR catalyst positioned upstream from a diesel particulate filter which has been coated with a second SCR catalyst (referred to herein as an SCR filter or SCR-coated filter). The SCR filter has a low catalyst loading, such that a lower backpressure is achieved over the use of a stand-alone SCR filter having a higher catalyst loading. The exhaust treatment system also provides effective catalyst efficiency for removal of $NO_x$.

According to one aspect, a diesel exhaust gas treatment system is provided which comprises a diesel particulate filter positioned in an exhaust stream, where the diesel particulate filter includes an inlet, an outlet, and at least one porous wall. The system includes a first SCR catalyst positioned at the inlet of the filter through which exhaust gas flows, and a second SCR catalyst coated on the filter. By coated "on," we mean that the catalyst 1) is coated on the filter such that it is positioned on the surface of the walls, inlet or outlet, 2) is coated on the porous walls such that it permeates the filter, i.e., it is positioned within the filter; or 3) is coated so that it is both within the porous filter walls and on the surface of the walls. In one embodiment, the SCR catalyst is within the walls of the filter.

The first SCR catalyst preferably has a loading of about 2 to 4 g/in.$^3$ The second SCR catalyst coated on the filter preferably has a loading of from about 0.5 to 1.2 g/in.$^3$ The first and second catalysts may comprise zeolite and a base metal selected from copper and iron.

In one embodiment, the diesel particulate filter has a porosity of from about 39 to 90%, which ensures permeation of the (second) SCR catalyst coating into the filter walls. In another embodiment, the diesel particulate filter has a porosity of from about 50 to 85%.

The exhaust gas treatment system further includes a diesel oxidation catalyst positioned upstream from the diesel particulate filter. The diesel oxidation catalyst may comprise platinum, palladium, or a combination thereof.

In one embodiment, the treatment system further includes a slip catalyst positioned downstream from the diesel particulate filter. The slip catalyst may comprise platinum, palladium, or a combination thereof.

The treatment system may further include a reductant delivery system positioned upstream from the first SCR catalyst which is adapted to provide a source of ammonia or urea to the exhaust stream.

In a method of treating diesel engine exhaust gases produced in an exhaust stream, exhaust gases are passed through a diesel oxidation catalyst and a diesel particulate filter positioned downstream from the diesel oxidation catalyst, where a first SCR catalyst is positioned at the inlet of the filter and a second SCR catalyst is coated on the filter. As the exhaust gases pass through the system, particulate matter from the exhaust gases is trapped on the filter, and a substantial portion of $NO_x$ in the exhaust stream is converted to $N_2$.

By "substantial portion," it is meant that at least 50% of the $NO_x$ in the exhaust stream is converted. Preferably, at least 90% of the $NO_x$ is converted.

In addition, a substantial portion of CO and HC in the exhaust stream are preferably converted to $CO_2$ and $H_2O$; and ammonia emissions are converted to nitrogen.

The method preferably includes providing a source of ammonia or urea to the exhaust stream. The diesel oxidation catalyst is preferably positioned upstream from the source of ammonia or urea.

Accordingly, it is a feature of the present invention to provide a diesel engine exhaust treatment system and method which is compact and efficient in removing undesirable components and particulates from the exhaust gas stream with minimal backpressure. Other features and advantages of the invention will be apparent from the following description, the accompanying drawings, and the appended claims.

BRIEF DESCRIPTION OF THE DRAWINGS

FIG. 3 is a graph illustrating measured backpressures of various exhaust treatment systems including embodiments of the invention; and FIG. 4 is a graph illustrating NOx conversion efficiency of various exhaust treatment systems including embodiments of the invention.

DETAILED DESCRIPTION OF THE PREFERRED EMBODIMENTS

Figure 1:
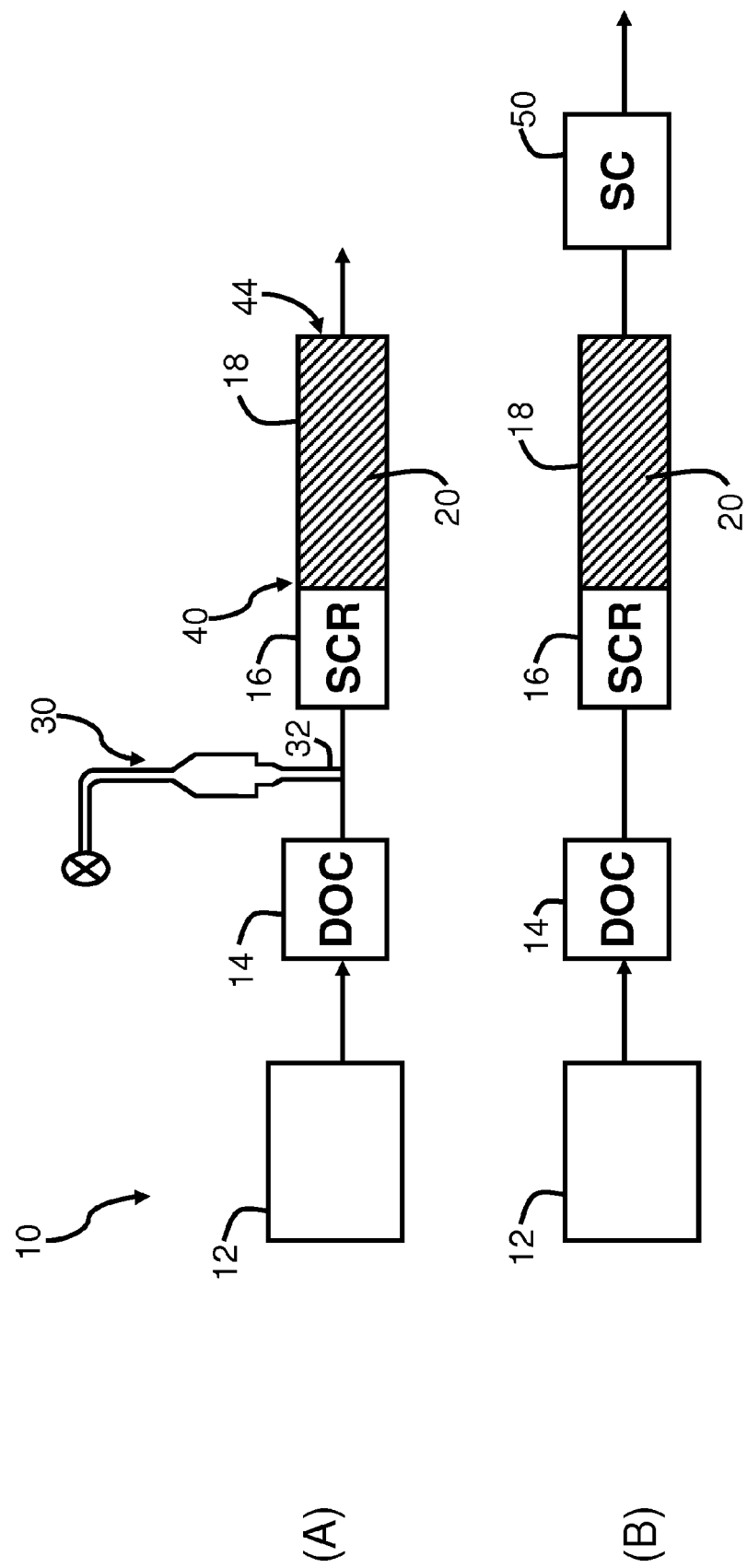
FIG. 1A is a schematic illustration of a diesel engine exhaust treatment system in accordance with an embodiment of the invention.
FIG. 1B is a schematic illustration of a diesel engine exhaust treatment system in accordance with another embodiment of the invention.

The use of an exhaust treatment system which includes a first SCR catalyst upstream from a diesel particulate filter coated with a second SCR catalyst allows the SCR coated filter to have a lower catalyst loading over the use of a stand-alone SCR filter. The system substantially reduces backpressure in the system over the use of a stand-alone SCR filter, while still providing efficient removal of $NO_x$ removal.

Referring now to FIGS. 1A and 1B, embodiments of the diesel exhaust treatment system 10 are illustrated. As shown in FIG. 1A, the exhaust treatment system is coupled to an exhaust manifold 12 of a diesel engine and includes a diesel oxidation catalyst 14 which is positioned upstream from a diesel particulate filter 18 which includes an inlet 40 and an outlet 44.

The diesel oxidation catalyst 14 may be coated on a refractory inorganic oxide or ceramic honeycomb substrate as a washcoat at about 0.1 to about 1 $g/ft^3$ and utilizes a catalyst material selected from platinum, palladium, or a combination thereof, and may also contain zeolites. The washcoat may further comprise a binder such as alumina, silica, titania, or zirconia.

A first SCR catalyst 16 is positioned at the inlet 40 of the diesel particulate filter 18 and is separate from the filter. The first SCR catalyst may comprise a zeolite and a base metal selected from copper and iron. The first SCR catalyst washcoat is coated to a loading of from about 1 to about 4 $g/in.^3$ and is prepared by coating a porous inert substrate with a slurry containing a base metal, zeolite, and binder material such as alumina, silica, titania or zirconia. Alternatively, the base metal/zeolite may be combined with ceramic binders/fibers and extruded into a monolith.

The first SCR catalyst 16 functions as a "flow through" SCR catalyst, i.e., the exhaust gas flows through one or more channels in the substrate in contrast to the second SCR catalyst, in which exhaust gas flows through the porous walls of the SCR-coated filter as will be explained in further detail below.

Figure 2:
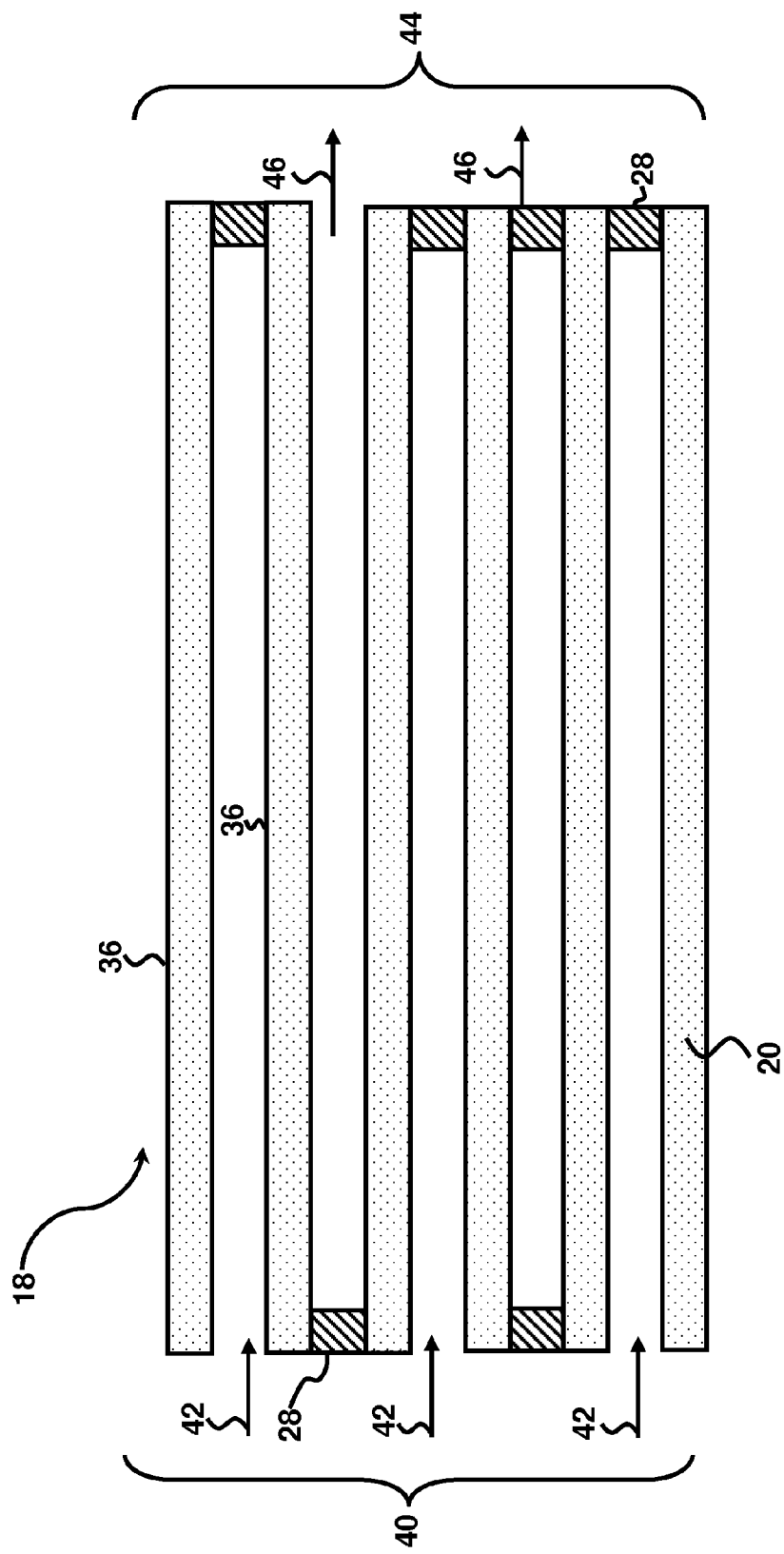
FIG. 2 is a schematic illustration showing an enlarged view of the diesel particulate filter of FIG. 1 including an SCR catalyst coating thereon.

A second SCR catalyst 20 is coated on and/or in the walls of diesel particulate filter 18. Referring now to FIG. 2, an enlarged view of the coated diesel particulate filter 18 of FIG. 1 is shown.

The diesel particulate filter 18 is preferably a wall flow filter comprising a highly porous filter substrate having a porosity of from about 30 to 90%, and more preferably, from about 50 to 85%. The size of the pores preferably range from about 5 to 50 μm, and more preferably, from about 15 to about 30 μm, but it should be appreciated that the distribution of pore sizes may vary throughout the filter substrate.

Suitable filter substrates include refractory inorganic oxides or ceramic or metal materials, such as cordierite, mullite, silicon carbide, aluminum titanate, alpha-alumina, silica, alkali, and alkaline earth zirconium phosphates (NZP). As can be seen, the filter 18 comprises a plurality of parallel channels separated by thin porous walls 36. The filter includes an inlet 40 comprising inlet channels 42 and an outlet 44 comprising outlet channels 46. The channels are open at one end and plugged at the opposite end with plugs 28 such that when particle laden exhaust gas flows through the walls, gas is able to escape through the pores in the wall material, but particulates are trapped on the surfaces of the walls.

In the embodiment shown, the filter 18 includes the second SCR catalyst 20 which has been coated so that it permeates the filter walls and is at least partially within the walls of the filter. Generally, the SCR washcoat is applied over the entire filter substrate in the form of a slurry such that the slurry is drawn into the pores in the substrate through capillary action. Alternatively, a vacuum may be applied to draw the slurry into the porous wall. The particle size of the washcoat materials are preferably selected so as to fit into the pores in the substrate wall without blocking them.

Because the second SCR catalyst 20 permeates the walls of the filter, this allows for greater contact time with the exhaust gas as it passes through those porous walls and thus higher $NO_x$ conversion. For example, the SCR washcoat may be drawn in from the inlet and outlet of the filter so that it at least partially permeates the walls. The washcoat may also be coated so that a small overlayer coating is provided at the inlet and/or outlet of the filter as long as it generates reduced backpressure. The second SCR catalyst washcoat is coated at a loading of from about 0.5 to about 1.2 $g/in.^3$ and may comprise a zeolite catalyst material and a base metal such as copper or iron. The remainder of the catalyst washcoat may comprise a binder, and a support material such as alumina, silica, titania, or zirconia.

To prepare the second SCR catalyst washcoat for the filter, each of the respective catalyst materials are added to an aqueous solution including a binder material the solution is then applied to the filter. After application of the catalyst washcoat, the coated filter is preferably calcined, for example, at about 750° C. for about 16 hours.

It should be appreciated that the composition of the first and second catalysts may be the same or different, depending on the desired system performance and/or durability requirements. For example, the SCR coating on the filter should be thermally stable under soot oxidation conditions, but the first SCR catalyst does not necessarily require the same thermal stability.

Referring again to FIG. 1A, the treatment system may further include a reductant delivery system 30 which is coupled to the exhaust manifold upstream of the first catalyst 16. A reductant, such as ammonia, aqueous urea or other ammonia-generating compounds, is stored in a storage vessel (not shown) and delivered to the reductant delivery system in metered amounts, typically in the form of a vaporized mixture of the reductant and water. The reductant delivery system includes an injector 32 for injecting the reductant into the exhaust stream at the appropriate time.

Referring now to FIG. 1B, the system may further include a slip catalyst 50 provided downstream from the diesel particulate filter. The slip catalyst generally comprises precious metals such as platinum, palladium, or a combination thereof and prevents unreacted ammonia from being emitted from the exhaust. The slip catalyst also aids in controlling hydrocarbon and carbon monoxide slip.

During operation, as exhaust gas generated by a diesel engine passes through the exhaust gas manifold 12, it passes through the diesel oxidation catalyst 14 such that conversion of unburned HC and CO occurs. The exhaust gas then flows through the first SCR catalyst 16. The gas then flows into the inlet 40 of the filter 18 and passes through the porous sidewalls of the filter 18 coated with the second SCR catalyst 20 such that the filter collects particulates contained in the exhaust gas. As the exhaust gas exits the filter, the gas flows toward an exhaust gas outlet (not shown).

As the gas passes through the first SCR catalyst 16 and the SCR-coated filter 18, the catalysts remove $NO_x$ from the gas stream by selective catalyst reduction with ammonia supplied from the reductant delivery system 30. Typically, the reductant delivery system 30 utilizes a liquid urea/water solution which is injected upstream of the filter 18 at metered intervals. The injected liquid urea/water mixture vaporizes and hydrolyzes to form ammonia. Thus, the $NO_x$ component in the gas is converted with selective catalytic reduction of $NO_x$ with ammonia to form nitrogen.

The slip catalyst 50 functions to reduce ammonia slip which can occur either from the reaction of the SCR catalyst, the release of ammonia from the surface of the catalyst(s) during rapid temperature increases, or from an excess of reductant. It should be noted that the slip catalyst should be selective toward oxidation of ammonia to nitrogen rather than the formation of $NO_x$ or $N_2O$.

Thus, the diesel oxidation catalyst 14 functions to remove hydrocarbons (HC) and carbon monoxide (CO) from the exhaust gas, the first SCR catalyst 16 functions to reduce $NO_x$ with aqueous urea injection, the diesel particulate filter 18 functions to filter particulate matter, while the second SCR catalyst 20 coated on the filter also functions to reduce NOx. The optional slip catalyst 50 is used to prevent ammonia slip.

In order that the invention may be more readily understood, reference is made to the following examples which are intended to illustrate embodiments of the invention, but not limit the scope thereof.

Example 1

A conventional SCR catalyst was positioned upstream from an SCR-coated filter having a low washcoat loading of 1.1 $g/in^3$ in accordance with the invention. The system backpressure and conversion efficiencies of the exhaust gas treatment system was compared with a system including a single SCR-coated filter at a higher washcoat loading of 2.1 $g/in^3$.

The steady state backpressure was measured at a bench flow reactor. The gas flow included 5% $CO_2$, 4.5% $H_2O$ and the balance $N_2$, and the total flow rate was 16.1 liter/min. The backpressure measurement was carried out at 150° C. As shown in FIG. 3, the use of a single SCR-coated filter with a loading of 2.1 $g/in^3$ (SCRF_H, 1 "Dx3"L) generated significantly higher backpressure than a bare high porosity (HP) filter substrate. In contrast, an SCR-coated filter with a catalyst loading of 1.1 $g/in^3$ (SCRF_L, 1 "Dx3"L) generated significantly lower backpressure than the first, higher loaded SCR filter (SCRF_H) and only slightly higher backpressure than a bare filter. The combination of a conventional SCR catalyst (1 "Dx1"L) and a second, lower loaded SCR filter (SCR+SCRF_L) with a total catalyst loading equal to that of the first, higher loaded SCR filter (SCRF_H), generated a lower backpressure than the SCRF_H alone.

Example 2

The catalytic efficiency of the system of Example 1 was evaluated. Steady state activity testing was conducted under the following conditions: flowing 350 ppm $NH_3$, 350 ppm $NO_x$, 14% O2, 5% $CO_2$, 4.5% $H_2O$, and the balance $N_2$. The total flow rate was 12.88 liter/min. The results are shown in FIG. 4. As can be seen, at the lower catalyst loading used in embodiments of the invention, the single, low-loaded SCR catalyst (SCRF_L) has a lower $NO_x$ removal efficiency at the temperature range of 150° C. to 500° C. in comparison with the single, higher loaded SCR-coated filter (SCRF_H). The combined system including a conventional SCR catalyst and low-loaded SCR filter (SCR+SCRF_L) having an equivalent total catalyst loading to SCRF_H showed slightly higher $NO_x$ removal than SCR_H alone. It can be seen that an exhaust aftertreatment system including an SCR filter at low loading in combination with a conventional SCR catalyst generates significantly lower backpressure than single catalyst systems while maintaining $NO_x$ removal efficiencies equivalent to or better than single SCR filter systems.

Having described the invention in detail and by reference to preferred embodiments thereof, it will be apparent that modifications and variations are possible without departing from the scope of the invention.

What is claimed is:

1. A diesel exhaust gas treatment system comprising:
  a diesel particulate filter positioned in an exhaust stream; said diesel particulate filter including an inlet, an outlet, and at least one porous wall; said diesel particulate filter including a first SCR catalyst positioned at said inlet of said diesel particulate filter through which exhaust gas flows and a second SCR catalyst coated on said diesel particulate filter; said second SCR catalyst comprising zeolite and a base metal selected from copper and iron; and a diesel oxidation catalyst positioned upstream from said diesel particulate filter.

2. The treatment system of claim 1 wherein said second SCR catalyst is coated within said walls of said filter.

3. The treatment system of claim 1 further including a slip catalyst positioned downstream from said diesel particulate filter.

4. The treatment system of claim 1 wherein said first SCR catalyst has a loading of about 2 to 4 g/in$^3$.

5. The treatment system of claim 1 wherein said second SCR catalyst has a loading of about 0.5 to 1.2 g/in$^3$.

6. The treatment system of claim 1 further including a reductant delivery system upstream from said diesel particulate filter; said delivery system adapted to provide a source of ammonia or urea to said exhaust stream.

7. The treatment system of claim 1 wherein said first SCR catalyst comprises zeolite and a base metal selected from copper and iron.

8. The treatment system of claim 3 wherein said slip catalyst comprises platinum, palladium, or a combination thereof.

9. The treatment system of claim 1 wherein said diesel oxidation catalyst comprises platinum, palladium, or a combination thereof.

10. The treatment system of claim 1 wherein said diesel particulate filter has a porosity of from about 30 to 90%.

11. The treatment system of claim 1 wherein said diesel particulate filter has a porosity of from about 50 to 85%.

12. A method for treating diesel engine exhaust gases comprising:
providing an exhaust gas treatment system comprising a diesel particulate filter including an inlet, an outlet, and a plurality of porous walls; said diesel particulate filter including a first SCR catalyst positioned at said inlet and a second SCR catalyst coated on said diesel particulate filter; said second SCR catalyst comprising zeolite and a base metal selected from copper and iron; and a diesel oxidation catalyst positioned upstream from said diesel particulate filter;
passing exhaust gases through said exhaust gas treatment system; wherein particulate matter from said exhaust gases is trapped on said diesel particulate filter, a substantial portion of $NO_x$ in said exhaust stream is converted to $N_2$; a substantial portion of CO and HC in said exhaust stream are converted to $CO_2$ and $H_2O$; and a substantial portion of ammonia emissions are converted to $N_2$.

13. The method of claim 12 including providing a source of ammonia or urea to said exhaust stream.

14. The method of claim 12 wherein said diesel oxidation catalyst is positioned upstream from said source.

15. The method of claim 12 wherein said treatment system further includes a slip catalyst positioned downstream from said filter.

* * * * *